United States Patent
Yamasaki et al.

(10) Patent No.: US 6,659,836 B1
(45) Date of Patent: Dec. 9, 2003

(54) FIGURE DATA INPUT DEVICE

(75) Inventors: Kazushi Yamasaki, Kyoto-fu (JP);
Motonobu Jinushi, Nagoya (JP);
Fusako Kusunoki, Tokyo (JP);
Hiromichi Hashizume, Tokyo (JP);
Masanori Sugimoto, Tokyo (JP)

(73) Assignee: Omron Corporation, Kyoto (JP)

( * ) Notice: Subject to any disclaimer, the term of this patent is extended or adjusted under 35 U.S.C. 154(b) by 53 days.

(21) Appl. No.: 09/722,690

(22) Filed: Nov. 28, 2000

(30) Foreign Application Priority Data

Nov. 30, 1999 (JP) .......................... 11-009100

(51) Int. Cl.⁷ .............................................. A63H 30/00
(52) U.S. Cl. .................... 446/175; 446/91; 446/118; 446/484; 434/128; 434/365; 273/237
(58) Field of Search ................... 446/118, 119, 446/397, 90–91, 477, 484; 434/156, 159, 167, 168, 169, 176, 185, 201, 307 R, 308; 273/236, 237, 263, 273, 282.1, 282.3, 288, 289

(56) References Cited

U.S. PATENT DOCUMENTS

| | | | | |
|---|---|---|---|---|
| 3,654,706 A | * | 4/1972 | Perrella ...................... 434/176 |
| 4,348,191 A | * | 9/1982 | Lipsitz et al. ................ 434/259 |
| 4,820,233 A | * | 4/1989 | Weiner ........................ 434/308 |
| 5,087,043 A | * | 2/1992 | Billings et al. ........... 273/157 R |
| 5,127,869 A | * | 7/1992 | Hanzawa ..................... 434/169 |
| 5,346,399 A | * | 9/1994 | Sakow ........................ 434/159 |
| 5,372,511 A | * | 12/1994 | Keung ........................ 434/327 |
| 5,648,999 A | * | 7/1997 | Easterling et al. .......... 455/412 |
| 5,813,861 A | * | 9/1998 | Wood ......................... 434/167 |
| 5,823,782 A | * | 10/1998 | Marcus et al. .............. 434/156 |
| 5,906,369 A | * | 5/1999 | Brennan et al. ............. 273/238 |
| 6,102,397 A | * | 8/2000 | Lee et al. ................... 273/238 |
| 6,129,605 A | * | 10/2000 | Cyrus et al. ................ 446/108 |
| 6,190,174 B1 | * | 2/2001 | Lam .......................... 273/237 |
| 6,361,396 B1 | * | 3/2002 | Snyder et al. .............. 446/397 |
| 6,364,735 B1 | * | 4/2002 | Bristow et al. ............. 446/397 |

* cited by examiner

*Primary Examiner*—Jessica Harrison
*Assistant Examiner*—Alex F. R. P. Rada, II
(74) *Attorney, Agent, or Firm*—Dickstein Shapiro Morin & Oshinsky LLP

(57) ABSTRACT

An figure data input device is provided, by which prompt and accurate simulation learning is realized by automatically reading out type identifying data and location data of a figure piece when the piece figure is placed on a mounting board. The educational figure data input device includes a figure piece composed of a figure portion replicating the outward appearance of an object and a storage unit for storing the type of the figure portion, which are combined into one body; a mounting board provided with a plurality of sectional mounting planes in such a manner that one figure piece is placed on only one of the plurality of sectional mounting planes; and a reading device, incorporated in the mounting board, for reading out type identifying data stored in the storage unit of the figure piece placed on the mounting board.

16 Claims, 7 Drawing Sheets

FIGURE 4

WRITING EXAMPLE OF TAG DATA

| Address | 07h | 06h | 05h | 04h | 03h | 02h | 01h | 00h | |
|---|---|---|---|---|---|---|---|---|---|
| | 00h | 00h | 00h | 00h | 00h | 00h | 11h | 10h | VACANT LOT |
| | 00h | 00h | 00h | 00h | 00h | 00h | 10h | FFh | PARK |
| | 00h | 00h | 00h | 00h | 00h | 00h | 10h | FEh | BUILDING |
| ⋮ | | | | | | | | | |
| | 00h | 00h | 00h | 00h | 00h | 00h | 10h | 12h | TREE |
| | 00h | 00h | 00h | 00h | 00h | 00h | 10h | 11h | FACTORY |
| | 00h | 00h | 00h | 00h | 00h | 00h | 10h | 10h | HOUSE |

FIGURE DATA INPUT DEVICE

BACKGROUND OF THE INVENTION

1. Field of the Invention

The present invention relates to a figure data input device, and more particularly to an educational figure data input device used in simulation learning for social education on surrounding environments that change in response to placement of figure pieces.

2. Description of Relevant Art

Today's educational input device comprises: a plurality of types of small pieces replicating environmental factors, such as a factory, a tree, and a house; a large board provided with section forming planes each partitioned vertically and horizontally from the others, so that only one piece can be placed on each of these sections; a plurality of types of cards with descriptions of environmental simulation data printed on them; and a personal computer that displays environmental simulation data outputted as a change in surrounding environments in response to input of the descriptions on these cards.

The educational input device is used, for example, by a small group of children as if they were playing a game. More specifically, children draw a card in turn, and place a piece on the board as per the description on the card. Meanwhile, they manually input the descriptions on the cards, the types and a total number of the pieces placed on the board into the personal computer, whereupon the personal computer displays on its screen a gradual change in response to the input, thereby assisting the children to learn how environments change.

However, manipulation of the foregoing educational input device is tedious and time-consuming, because children have to manually input data related to the placement of each piece on the board to the personal computer. Also, the latency for an image to be displayed on the screen reduces learning efficiency. Moreover, children may make mistakes while inputting data, thereby reducing the reliability of the output. In view of the foregoing, there has been an increasing need to develop an educational input device for realizing prompt and accurate simulation learning.

BRIEF SUMMARY OF THE INVENTION

It is therefore an object of the present invention to provide a figure data input device for realizing prompt and accurate simulation learning by automatically reading out identification data and location data of a figure piece when the figure piece is placed on a mounting board.

With the above and other objects in view, the present invention provides a figure data input device including: a figure piece composed of a figure portion replicating the outward appearance of an object and a storage unit for storing the type of figure portion; a mounting board provided with a plurality of sectional mounting planes in such a manner that only one figure piece can be placed on each of the plurality of sectional mounting planes; and a reading device, incorporated into the mounting board, for reading out the type identifying data stored in the storage unit of a figure piece placed on the mounting board.

According to the present invention, the type identifying data stored in the storage unit of a figure piece is read out by the reading device when the user places the figure piece on one of the sectional mounting planes of the mounting board. Also, the location data of the figure piece is detected from the reading position of the reading device.

Thus, the user can obtain both the type identifying data and location data of a figure piece simultaneously by merely placing the figure piece on the mounting board. For this reason, if the data is transmitted to a linked machine, such as a personal computer, an environmental change in response to the user's placement is displayed on the display screen when the user places the figure piece on the mounting board, thereby realizing prompt and accurate simulation learning that responds to the user's placement.

In particular, because the reading action starts automatically when the user places the figure piece on the mounting board, not only can the user omit manually inputting the type identifying data and location data, but also the latency for the input data to be outputted to the monitor can be eliminated, thereby making it possible to enhance learning efficiency.

For a fuller understanding of the nature and advantages of the invention, reference should be made to the ensuing detailed description taken in conjunction with the accompanying drawings.

BRIEF DESCRIPTION OF THE DRAWINGS

FIG. 4 is a view showing a writing example of tag data;

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that structural changes may be made and equivalent structures substituted for those shown without departing from the spirit and scope of the present invention.

Figure 1:
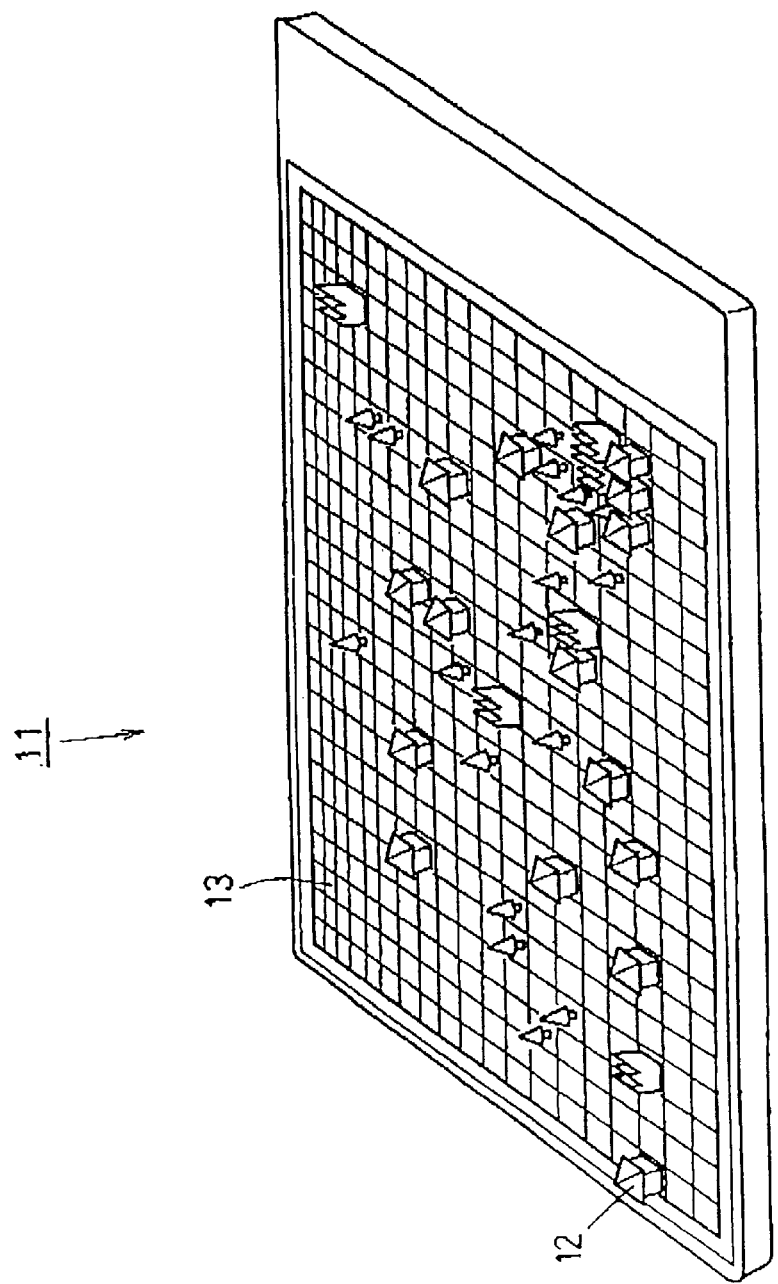
FIG. 1 is a perspective view showing an outward appearance of a figure data input device.

FIG. 1 is a view showing a figure data input device 11 for environmental simulation learning. The figure data input device 11 comprises a plurality types of small figure pieces 12 and a large mounting board 13.

Figure 2A:
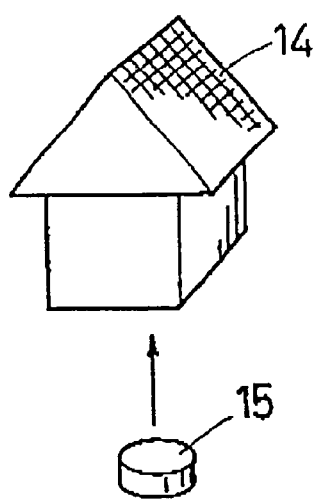
FIGS. 2A and 2B are an explanatory view showing figure pieces in the making.
Figure 2A:
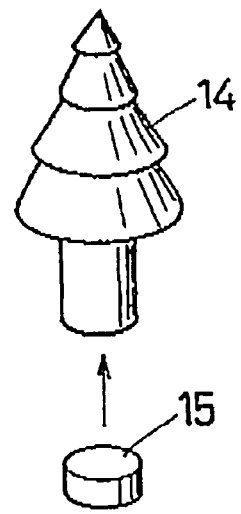

As shown in FIG. 2(A), each figure piece 12 is composed of two portions combined into one body: a figure portion 14 replicating the outward appearance of an object, such as a house or a tree, and an RF-ID tag ("tag") 15 used as a data carrier that stores data identifing the type of the figure portion 14 in a manner readable by an external device via a wireless communication.

Figure 2B:
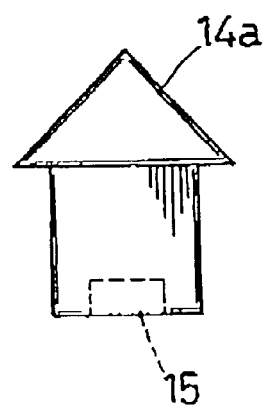
Figure 2B:

In this case, the figure portion 14 and tag 15 are combined with each other in the manner as shown in FIG. 2(B). More specifically, for example, the small tag 15 is fitted into a figure portion 14a replicating a house so as to be incorporated therein at the lower portion, or the tag 15 is coupled to the bottom surface of a figure portion 14b replicating a tree.

It is preferable for communications between the figure piece 12 and the mounting board 13 to attach the tag 15 to the bottom of figure piece 12 because the bottom of figure piece 12 faces the mounting board 13.

Figure 3A:
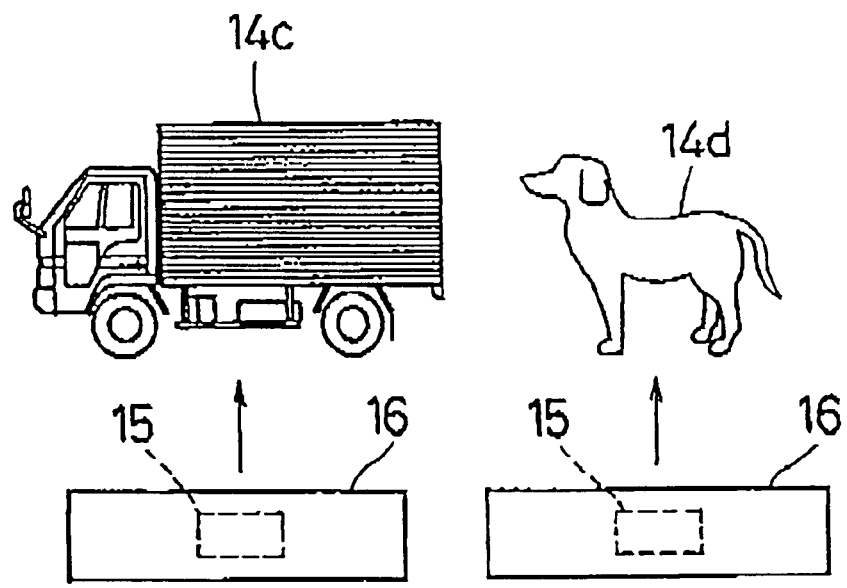
FIGS. 3A and 3B are an explanatory view showing complex figure pieces in the making.
Figure 3B:
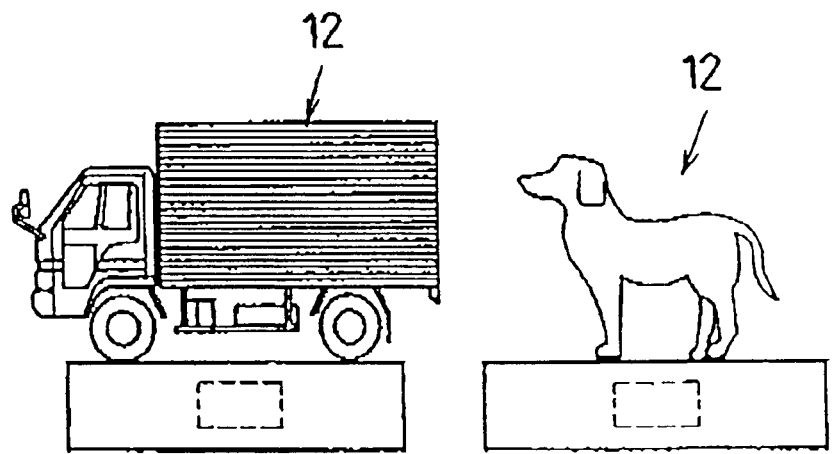

When the tag 15 is not readily attached to the bottom of the figure portion 14 due to the complex configuration of the latter, the figure piece 12 is made in the following manner. That is, as shown in FIG. 3 (A), if the bottom configuration of the figure portion 14 is complex as is figure portion 14c replicating an automobile or as is figure portion 14d replicating an animal, a pedestal 16 with the tag 15 incorporated therein can be used. More specifically, as shown in FIG. 3 (B), the figure piece 12 is made by combining the figure portion 14c replicating an automobile and the pedestal 16 into one body, or the figure piece 12 is made by combining the figure portion 144 replicating an animal and the pedestal 16 into one body.

FIG. 4 is a view showing a writing example of tag data, in which identification data encoded uniquely for each type of the figure pieces 12 is written into the tag 15 in such a manner that the type identified by the type identifying data written into the tag 15 matches with the type of the figure portion 14 to which the tag 15 is attached.

For example, in the case of the tag data shown in FIG. 4, if the figure piece 12 replicates a house, the tag data encoded as "01010h" is written into the tag 15 to match the type of the figure portion 14 that the tag 15 is attached to. Likewise, if the figure piece 12 replicates a factory, the tag data encoded as "1011h" is written into the tag 15, and if the figure piece 12 replicates a tree, the tag data encoded as "111012h" is written into the tag 15, so that the identified types match with the types of their respective figure portions 14 to which these tags 15 are attached.

Figure 5:
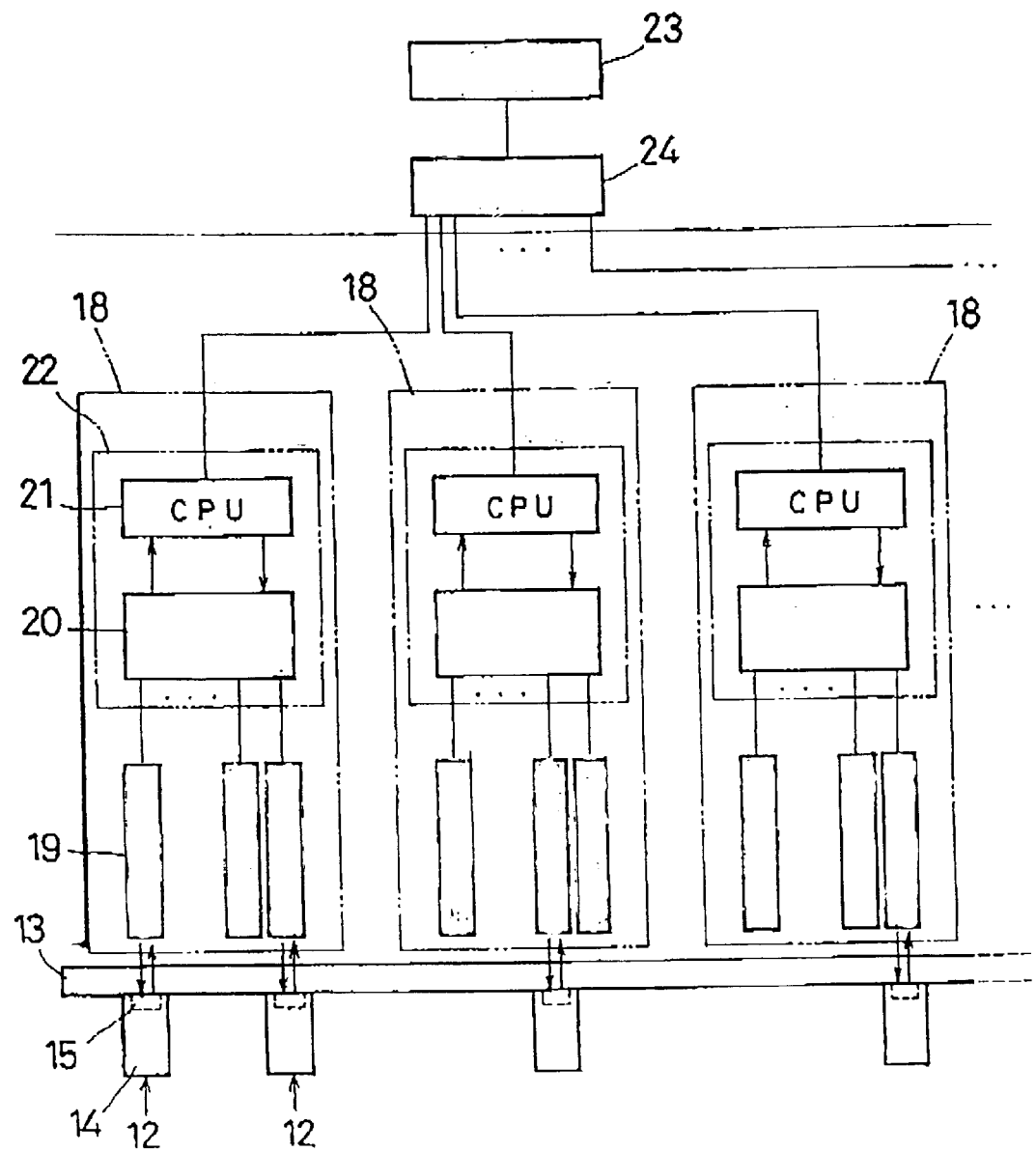
FIG. 5 is a block diagram showing a control circuit in the figure data input device.
Figure 6:
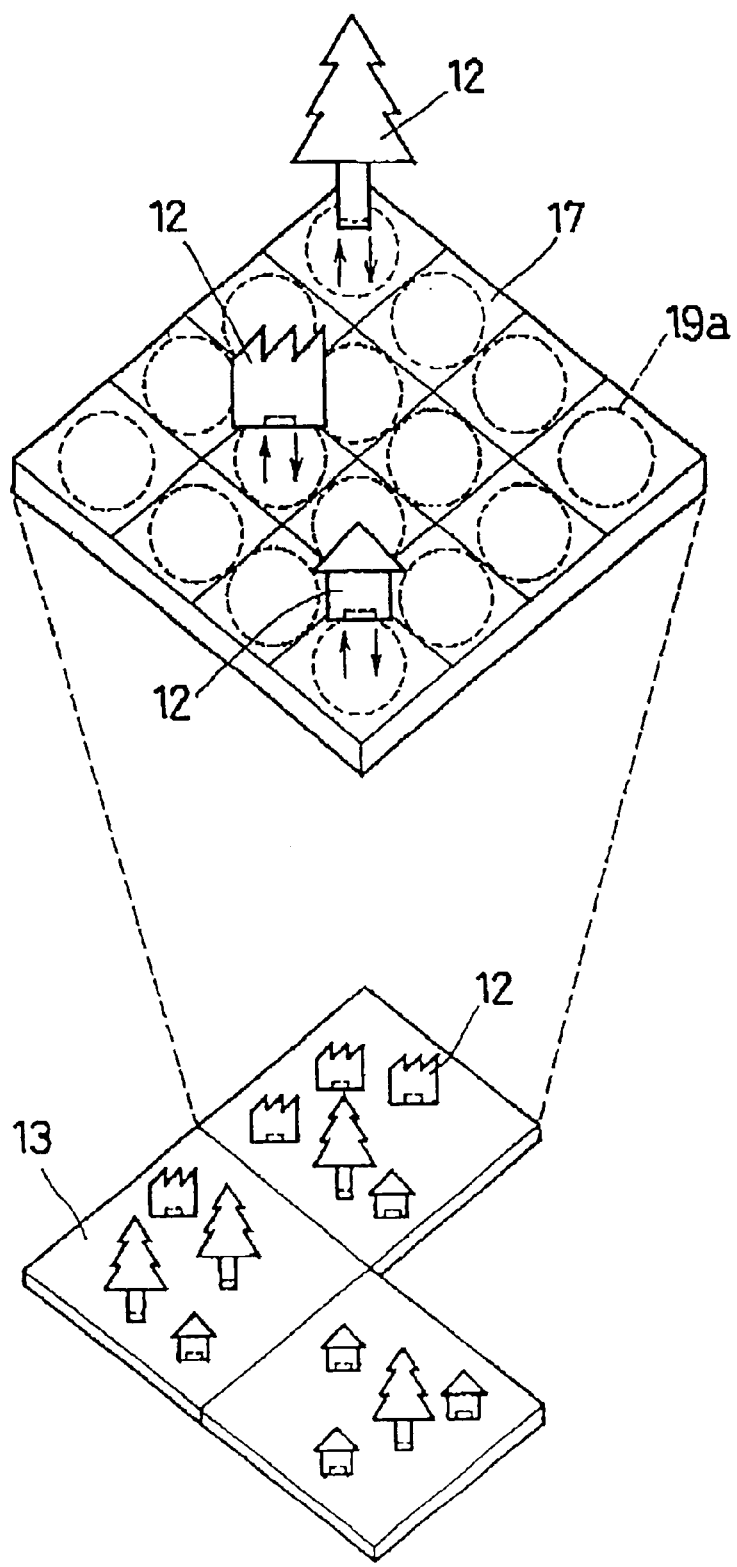
FIG. 6 is an explanatory view schematically showing a mounting board in the making.

As shown in FIGS. 5 and 6, the mounting board 13, on which the foregoing figure pieces 12 are placed, is provided with a plurality of substantially square sectional mounting planes 17 partitioned by vertical and horizontal lines like squares printed on a graph paper on its surface, so that only one figure piece 12 is placed on each of the sectional mounting planes 17. Also, the mounting board 13 incorporates reading devices 18 in a one-to-one correspondence with the sectional mounting planes 17 at the inner position facing the latter.

Each reading device 18 reads the type identifying data stored in the tag 15 in the figure piece 12 placed on the corresponding sectional mounting plane 17, and comprises a plurality of antenna coils 19 positioned to face the corresponding sectional mounting plane 17, and a control circuit 22 having an antenna coil control circuit 20 and a CPU 21 both for controlling the plurality of antenna coils 19 as one group. For example, one antenna coil group is composed of a 4 by 4 (4×4) array of sixteen antenna coils 19 each serving as a reading position, and these antenna coils 19 are controlled collectively when activated for a reading action. Thus, by providing a plurality of the reading devices 18, a desired size, as large as the mounting board 13, can be used, and the communication areas 19a, each being composed of one group of the antenna coils 19, correspond to the reading devices 18 in a reliable manner.

Consequently, when the figure piece 12 is placed on one of the sectional mounting planes 17, the type identifying data, which is written into the tag 15 incorporated into the figure piece 12, is placed on the communication area 19a, whereby all the antenna coils 19 positioned to face the communication area 19a start the reading action.

The control circuit 22 controls each of the sixteen antenna coils 19, and reads and keeps track of the data in real time as to what type of figure piece 12 is placed on which of the sixteen divided positions of a particular reading device 18.

At the same time, in order to read and keep track of the placement of each figure piece 12 independently, the control circuit 22 in each reading device 18 is linked to a high-order machine, such as the personal computer 24 for the external output, via an interface circuit 23 to establish a communication, and therefore, the address number of the reading device 18 and the placement of the figure piece 12 are sent to the personal computer 24 instantaneously.

Figure 7:
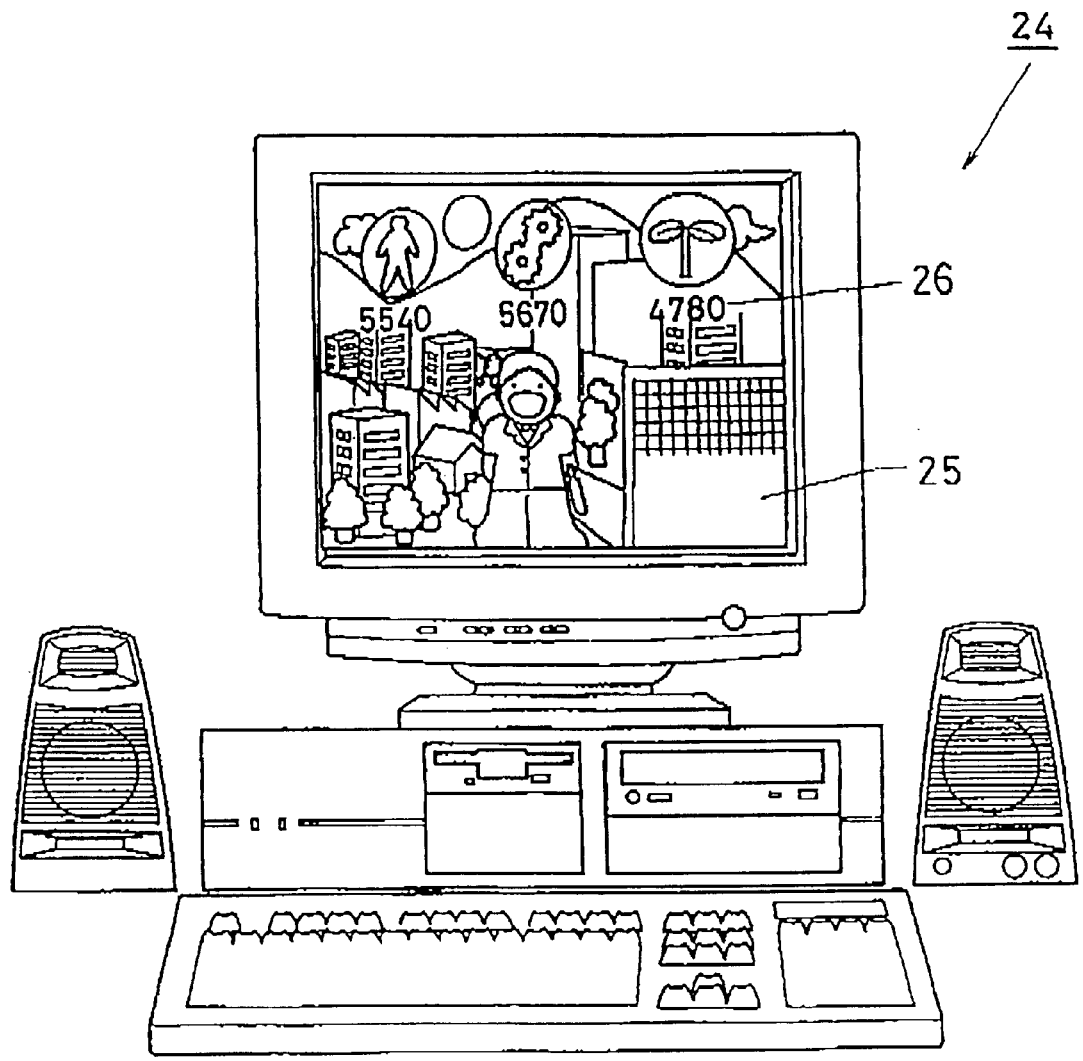
FIG. 7 is a view showing an example of environmental simulation learning.

By receiving the identification address number of the reading device 18 and the location data of the subject figure piece 12 via the interface circuit 23, the personal computer 24 can keep track of all the figure pieces 12 placed on the mounting board 13 and run an environmental simulation software program based on their latest locations. Then, as shown in FIG. 7, the personal computer 24 displays on its monitor (display unit) 25 a resulting 3-D image in response to an environmental change. The personal computer 24 can also display numerical parameters 26 identifying the types of the corresponding environment's changing elements for better understanding.

Because the readout information from each reading device 18 is sent to the personal computer 24 repetitively via the interface circuit 23, the personal computer 24 can keep track of the locations of all the figure pieces 12 on the mounting board 13 and respond to a change in the locations instantaneously. Hence, the running result of the environmental simulation software program changes from moment to moment in real time, thereby realizing prompt and accurate simulation learning on town planning.

The following description will describe a case where the above-arranged figure data input device 11 is used for simulation learning on town planning.

When the user picks up and places an arbitrary figure piece 12 on an arbitrary sectional mounting plane 17 of the mounting board 13, the type identifying data stored in the tag 15 incorporated in the figure piece 12 is instantly read by the reading device 18. Also, location data of the reading device 18 and that of the figure piece 12 within the communication area 19a of the reading device 18 are detected from the reading position of the reading device 18, which are sent to the high-order personal computer 24.

Meanwhile, the personal computer 24 displays on the monitor 25 an environmental change occurring in response to the user's placement of the figure piece 12. Consequently, efficient simulation learning on town planning that responds to the user's placement can be realized.

As has been discussed, the user can obtain both the type identifying data and location data of a figure piece 12 simultaneously by merely placing the figure piece 12 on the mounting board 13, and the latest town planning state can be displayed on the monitor 25 of the personal computer 24 instantaneously. In particular, because the reading action starts automatically when the user places the figure piece 12 on the mounting board 13, not only can the user omit manually inputting the type identifying data and location data, but also the latency for the input data to be outputted to the monitor 25 can be eliminated, thereby making it possible to enhance learning efficiency.

In the above embodiment, a house, a tree, a factory, etc. were explained as examples of the objects replicated by the figure pieces 12 of the present invention, and the tag 15 was explained as an example of the storage unit. It should be appreciated, however, that the present invention is not limited to the arrangements described in the above embodiment, and can be modified in various ways in accordance with the technical idea disclosed in the following claims.

For example, in the above embodiment, the location data of the figure piece 12 was detected based on the presence or absence of wireless communication data in the antenna coils 19. However, touch points coordinates may be provided in each sectional mounting plane 17 of the mounting board 13, so that the location data is detected from these touch points coordinates.

Also, the present invention was used for environmental simulation learning on town planning by using houses, trees, factories, etc. However, the use of the present invention is not limited to the foregoing, and can be extended to simulation learning on distribution of living creatures by using figure pieces 12 replicating animals, fish, and birds in each region, or simulation learning on natural disasters by using figure pieces 12 that replicate a typhoon, a flood, an earthquake, a fire, etc.

According to the above invention, as soon as the user picks up and places an arbitrary figure piece 12 on one of the arbitrary sectional mounting planes 17 of the mounting board 13, the type identifying data stored in the storage unit incorporated in the figure piece 12 is read out by the recording device, and the location data of the figure piece is also detected from the reading position of the reading device.

Consequently, the user can obtain both the type identifing data and location data of a figure piece 12 simultaneously by merely placing the figure piece 12 on the mounting board 13. Thus, if the data is sent to a linked machine, such as a personal computer 24, an environmental change in response to the user's placement is displayed on the display screen when the user places the figure piece 12 on the mounting board 13, thereby realizing prompt and accurate simulation learning that responds to the user's placement.

While preferred embodiments of the present invention have been described using specific terms, such description is for illustrative purposes, and it is to be understood that changes and variations may be made without departing from the spirit or scope of the following claims.

What is claimed as new and desired to be protected by Letters Patent of the United States is:

1. A system for using a figure data input device comprising:
   a collection of figure pieces, the collection containing a plurality of figure pieces in each of a variety of types of objects, each figure piece being composed of a figure portion replicating the outward appearance of an object and a storage unit for storing data identifying the type of object category to which said figure portion belongs, which are combined into one body;
   a mounting board having a plurality of sectional mounting planes provided in such a manner that one figure piece can be placed on each of said plurality of sectional mounting planes;
   a reading device, incorporated in said mounting board and having a respective one-to-one correspondence with each of said plurality of sectional mounting planes, for reading out type identifying data stored in said storage unit of said figure piece and a placement location of said figure piece, when placed on said mounting board; and
   a programmable machine running an environmental simulation program for receiving data from said reading device;
   wherein once said figure piece is placed on said mounting board, said reading device reads said type of said figure portion from said storage unit and provides data regarding the placement location of said figure piece to said programmable machine.

2. A system as in claim 1, wherein said reading device reads said type of said figure portion through a wireless communication.

3. A system as in claim 1, wherein said reading device reads said type of said figure portion through touch points.

4. A system as in claim 1, further comprising an interface circuit wherein said reading device supplies said type of said figure portion and said placement location data to a personal computer by way of said interface circuit.

5. A system as in claim 4, wherein the category of figure pieces relates to town planning.

6. A system as in claim 1, wherein the environmental simulation program automatically displays environmental simulation data outputted as a change in surrounding environments in response to placing one of said figure pieces.

7. A figure piece collection comprising:
   a plurality of figure pieces of various types, the collection including at least two pieces of each of said various types each figure including a figure portion replicating the outward appearance of an object and a storage unit storing data identifying a type of object category to which said figure piece belongs.

8. A figure piece collection as in claim 7, wherein said data identifing said type of said figure piece can be transmitted from said storage unit through a wireless communication.

9. A figure piece collection as in claim 8, wherein said data identifying said type of said figure piece can be transmitted from said storage unit through touch points.

10. A mounting board comprising:
    a plurality of sectional mounting planes;
    a reading device, incorporated into said mounting board, for reading out data identifying a type of figure category stored in a figure piece when said figure piece is placed on said mounting board; and
    a programmable machine running an environmental simulation program for receiving data from said reading device.

11. A mounting board as in claim 10, wherein said reading device reads the type of a figure portion from a figure piece through a wireless communication.

12. A mounting board as in claim 10, wherein said reading device reads the type of a figure portion from a figure piece through touch points.

13. A method of using a figure data input device comprising:
    storing in said figure piece data identifing a type of object category in which said figure piece is classified;
    placing a figure piece on a mounting board in one of a plurality of sectional mounting planes;
    reading said type identifying data from said figure pieces and a placement location of said figure piece when said figure pieces are placed on a mounting board;
    transmitting said type identifying data and placement locations; and
    automatically displaying environmental simulation data outputted as a change in surrounding environments in response to placing said figure piece.

14. A method as in claim 13, wherein said reading of said type identifying data is accomplished through a wireless communication.

15. A method as in claim 13, wherein said reading of said type identifying data is accomplished through touch points.

16. A method as in claim 13, wherein location data of said figure piece is obtained from a reading position of a reading device.

* * * * *